E. S. WORTHAM.
CONCRETE PIPE.
APPLICATION FILED JULY 8, 1911.
1,014,735. Patented Jan. 16, 1912.
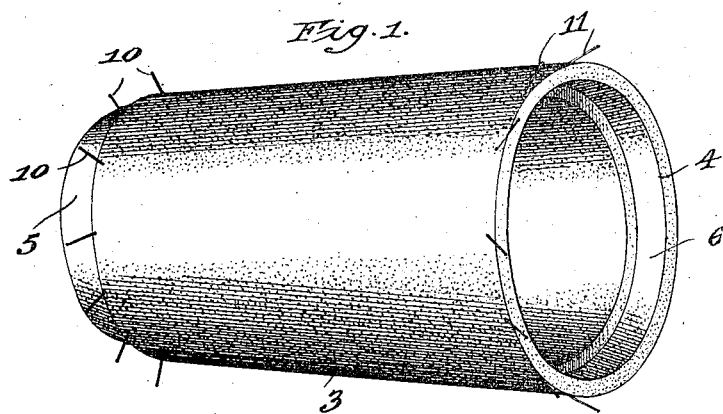
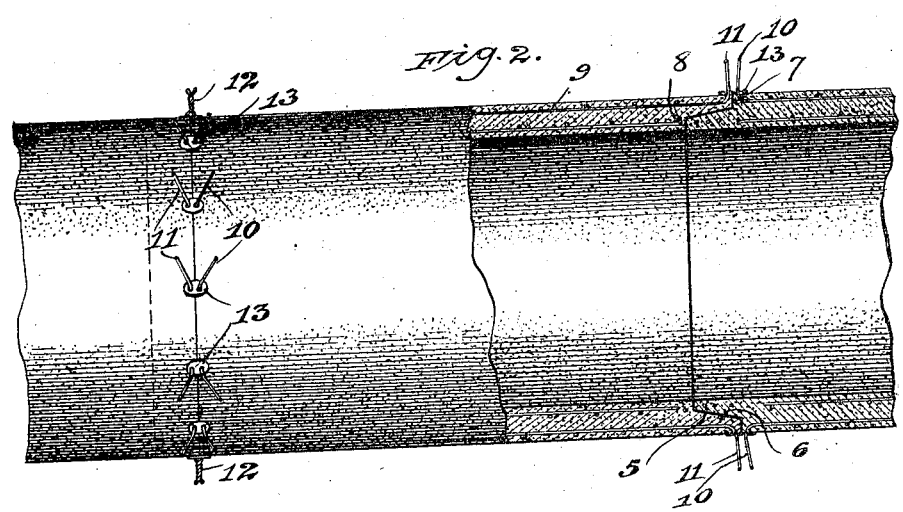

UNITED STATES PATENT OFFICE.

ELLIOTT S. WORTHAM, OF CHICAGO, ILLINOIS.

CONCRETE PIPE.

1,014,735.  Specification of Letters Patent.  Patented Jan. 16, 1912.

Application filed July 8, 1911. Serial No. 637,453.

*To all whom it may concern:*

Be it known that I, ELLIOTT S. WORTHAM, a citizen of the United States, residing at Chicago, in the county of Cook and State of Illinois, have invented certain new and useful Improvements in Concrete Pipes, of which the following is a specification.

My invention relates to a simple, economical and efficient means for permanently joining the meeting ends of adjacent concrete pipe sections, which means also enable pipe sections to be drawn in close contact, besides serving as reinforcing members in the concrete.

To these ends, therefore, the invention consists in the structure shown in the accompanying drawing, in which—

Figure 1 is a perspective view of a concrete pipe having my improved fastening device embedded therein; Fig. 2 is a side elevational view of a concrete pipe section, part of which is broken away and other parts in section showing my improved fastening means.

Referring now more particularly to the drawing, the pipe 3 herein shown is annular in cross-section, although it is obvious that it may be of any desired shape, and is provided with a bell mouth 4 at one end and a lip 5 at its other end; the lip being preferably tapered for complementary engagement with the tapered interior surface 6 of the bell mouth 4. The lip 5 terminates in a shoulder 7 while the tapered surface 6 terminates in a shoulder 8, so that when the tapered lip of one pipe section is brought into engagement with the bell mouth of an adjacent pipe section, the end of the lip abuts against the shoulder 8 and the end of the bell mouth abuts against the shoulder 7.

The construction so far described is of an old and well-known character and constitutes alone no part of my invention, which resides in the means for drawing and holding abutting ends of pipe sections together.

I accomplish the objects of my invention by embedding a plurality of retaining devices 9 in the body of each pipe section which are arranged circumferentially and extend longitudinally thereof; one end 10 of each retaining device projecting from the body of each section near its lip end and the other end 11 of each retaining device projecting from the body of each section near its bell mouth end. These retaining devices also serve as reinforcing members for the concrete. The retaining devices are uniformly spaced apart upon each section so that when two sections are brought together for complementary engagement, the retaining devices may be brought into registering or longitudinal alinement and the adjacent ends of the retaining devices are then twisted together, as shown at 12, forming a mechanical lock or union to hold the pipe sections together. In the preferred form I provide washers 13 through which each pair of oppositely disposed or adjacent ends extend, but it is obvious that the washers can be omitted if desired.

The manner of joining two or more sections is substantially as follows: The lip end of one pipe section is inserted within the bell mouth of an adjacent pipe section so as to bring the projecting ends of the retaining devices on one section opposite the projecting ends on the other section. The washers are then slipped over opposite ends, whereupon the ends are twisted, which draws the meeting surfaces of adjacent pipe sections together and firmly holds the same, preventing their separation.

Having now described my invention, I claim:

The combination with a plurality of concrete pipe sections, each section having a mouth at one end and a lip at its other end for complementary engagement with the mouth of an adjacent pipe section, of a plurality of fastening wires embedded in each section and having their ends projecting exteriorly of each section near both of its ends to bind the mouth and lip portions thereof, whereby the projecting ends of the wires of adjacent pipe sections may be twisted together for drawing and holding said adjacent pipe sections together.

ELLIOTT S. WORTHAM.

Witnesses:
SADIE M. RYAN,
JAMES R. OFFIELD.